(12) United States Patent
Bellaouar et al.

(10) Patent No.: US 9,026,069 B2
(45) Date of Patent: May 5, 2015

(54) METHOD AND DEVICE FOR SENDING SIGNALS BETWEEN A RADIO FREQUENCY CIRCUIT AND A BASEBAND CIRCUIT

(75) Inventors: Abdellatif Bellaouar, Richardson, TX (US); Steve Felix, Bristol (GB); Hamid Safiri, Plano, TX (US)

(73) Assignee: Nvidia Technology UK Limited, London (GB)

( * ) Notice: Subject to any disclaimer, the term of this patent is extended or adjusted under 35 U.S.C. 154(b) by 339 days.

(21) Appl. No.: 13/640,079

(22) PCT Filed: Apr. 8, 2011

(86) PCT No.: PCT/EP2011/055576
§ 371 (c)(1),
(2), (4) Date: Jun. 21, 2013

(87) PCT Pub. No.: WO2011/124717
PCT Pub. Date: Oct. 13, 2011

(65) Prior Publication Data
US 2014/0051365 A1  Feb. 20, 2014

(30) Foreign Application Priority Data
Apr. 9, 2010  (GB) .................................. 1005983.0

(51) Int. Cl.
*H01Q 11/12* (2006.01)
*H04B 1/04* (2006.01)
*H04B 1/40* (2006.01)

(52) U.S. Cl.
CPC . *H04B 1/40* (2013.01); *H04B 1/406* (2013.01)

(58) Field of Classification Search
CPC ....................................................... H04B 1/406

USPC ................................................ 455/127.4, 73
See application file for complete search history.

(56) References Cited

U.S. PATENT DOCUMENTS

2007/0164828 A1   7/2007   Uozumi et al.

FOREIGN PATENT DOCUMENTS

| EP | 1170874 A1 | 1/2002 |
| EP | 1304808 A1 | 4/2003 |
| WO | 2006124949 A2 | 11/2006 |
| WO | 2011124717 A1 | 10/2011 |

OTHER PUBLICATIONS

"Dig RF Baseband/RF Digital Interface Specification," XP-002325710, Logical, Electrical and Timing Characteristics, EGPRS Version, Version 1.12, Feb. 20, 2004, 32 pages.

*Primary Examiner* — Eugene Yun

(57) ABSTRACT

A method, device and computer program product is provided for sending a data signal and a clock signal between a radio frequency circuit of a device and a baseband circuit of the device, the radio frequency circuit being configured for at least one of transmission and reception of radio signals in a radio frequency band, where the clock signal has a clock frequency $F_c$. The method comprises selecting the clock frequency $F_c$ to be a rational multiple of the 0.270833 MHz symbol rate of the Global System for Mobile Communications (GSM) standard and a rational multiple of the 3.84 MHz chipping rate of the Wideband Code Division Multiple Access (WCDMA) interface. The clock frequency $F_c$ is selected such that the clock signal can be generated using a 38.4 MHz or 19.2 MHz reference clock signal, a non-fractional Phase Locked Loop clock multiplier and an output divider, without first having to divide down the reference clock signal. The data signal and the clock signal can then be sent between the radio frequency circuit and the baseband circuit using the selected clock frequency $F_c$.

20 Claims, 2 Drawing Sheets

METHOD AND DEVICE FOR SENDING SIGNALS BETWEEN A RADIO FREQUENCY CIRCUIT AND A BASEBAND CIRCUIT

CROSS-REFERENCE TO RELATED APPLICATION

This application is the National Stage of, and therefore claims the benefit of, International Application No. PCT/EP2011/055576 filed on Apr. 8, 2011, entitled "Method and Device for Sending Signals Between a Radio Frequency Circuit and a Baseband Circuit," which was published in English under International Publication Number WO 2011/124717 on Oct. 13, 2011, and has a priority date of Apr. 9, 2010, based on GB application 1005983.0. Both of the above applications are commonly assigned with this National Stage application and are incorporated herein by reference in their entirety.

FIELD OF THE INVENTION

The present invention relates to a method and a device for sending signals between a radio frequency circuit and a baseband circuit. In particular, the present invention relates to sending a data signal and a clock signal between the radio frequency circuit and the baseband circuit.

BACKGROUND

A device operating in a radio transmission system may have a radio frequency circuit (e.g. an RF chip) and a baseband circuit (e.g. a baseband chip), with a link allowing data to be sent between the radio frequency circuit and the baseband circuit. The radio frequency circuit includes at least one antenna for transmitting and receiving radio signals over the radio transmission system. The radio frequency circuit operates at radio frequencies (of the order of $10^9$ Hz) to transmit and receive the radio signals. The baseband circuit operates at the operating frequency of the device (of the order of $10^8$ Hz).

When a radio signal is received at the device it may be demodulated in the radio frequency circuit to extract the data carried in the radio signal. The demodulated signal is then sent to the baseband circuit for use in the device. In some systems where the baseband circuit operates in the digital domain, the demodulated signal (which is an analogue signal) is passed through an analogue to digital converter in the radio frequency circuit before being sent to the baseband circuit over the link. Therefore digital signals are sent over the link. The demodulated data signal can comprise at least one data stream signal which can be sent over the link. In addition to sending the at least one data stream signal, a clock signal is sent over the link providing timing information allowing the baseband circuit to interpret the data stream signal(s). The clock signal (having a frequency $F_C$) can be generated from a reference clock signal on the device.

Similarly, when signals are to be transmitted from the device via the antenna, the signals are sent from the baseband circuit to the radio frequency circuit over the link. The signal comprises a data signal (which can comprise at least one data stream signal) and a clock signal. On the radio frequency circuit the data signal is passed through a digital to analogue converter to convert the data signal into an analogue signal. The analogue signal is modulated in the radio frequency circuit and then transmitted over the radio transmission system from the device using the antenna.

One such system is described in the US patent application by Mohindra et al entitled "Serial Digital Interface for Wireless Network Radios and Baseband Integrated Circuits" published under publication number US 2005/0119025 A1 which discloses a system including a radio receiver integrated circuit, a radio transmitter integrated circuit and a baseband digital signal processing integrated circuit with a digital interface between the radio integrated circuits and the baseband digital signal processing integrated circuit.

As explained above, when a radio signal is received at a device operating in a radio transmission system it is converted into a data signal (and an accompanying clock signal) to be sent over the link to the baseband circuit. Similarly, when a data signal and an accompanying clock signal are sent over the link to the radio circuit to be transmitted they are converted into a radio signal. These conversions consume processing power and can take time to implement and it would therefore be advantageous to reduce the complexity of these conversion operations.

SUMMARY

According to a first aspect of the invention there is provided a method of sending a data signal and a clock signal between a radio frequency circuit of a device and a baseband circuit of the device, the radio frequency circuit being configured for at least one of transmission and reception of radio signals in a radio frequency band, the clock signal having a clock frequency $F_C$, the method comprising: selecting the clock frequency $F_C$ to be a rational multiple of the 0.270833 MHz symbol rate of the Global System for Mobile Communications (GSM) standard and a rational multiple of the 3.84 MHz chipping rate of the Wideband Code Division Multiple Access (WCDMA) interface, wherein the clock frequency $F_C$ is selected such that the clock signal can be generated using a 38.4 MHz or 19.2 MHz reference clock signal, a non-fractional Phase Locked Loop clock multiplier and an output divider, without first having to divide down the reference clock signal; and sending the data signal and the clock signal between the radio frequency circuit and the baseband circuit using the selected clock frequency $F_C$.

According to a second aspect of the invention there is provided a device comprising: a radio frequency circuit configured for at least one of transmission and reception of radio signals in a radio frequency band; and a baseband circuit, the device being configured to send a data signal and a clock signal between the radio frequency circuit and the baseband circuit, the clock signal having a clock frequency $F_C$, the device being further configured to: select the clock frequency $F_C$ to be a rational multiple of the 0.270833 MHz symbol rate of the Global System for Mobile Communications (GSM) standard and a rational multiple of the 3.84 MHz chipping rate of the Wideband Code Division Multiple Access (WCDMA) interface, wherein the device is configured to select the clock frequency $F_C$ such that the clock signal can be generated using a 38.4 MHz or 19.2 MHz reference clock signal, a non-fractional Phase Locked Loop clock multiplier and an output divider, without first having to divide down the reference clock signal; and send the data signal and the clock signal between the radio frequency circuit and the baseband circuit using the selected clock frequency $F_C$.

According to a third aspect of the invention there is provided a computer program product comprising computer readable instructions for execution at a device, the device comprising a baseband circuit and a radio frequency circuit configured for at least one of transmission and reception of radio signals in a radio frequency band, the device being configured to send a data signal and a clock signal between the radio frequency circuit and the baseband circuit, the clock signal having a clock frequency $F_C$, the instructions comprising instructions for: selecting the clock frequency $F_C$ to be a rational multiple of the 0.270833 MHz symbol rate of the Global System for Mobile Communications (GSM) standard and a rational multiple of the 3.84 MHz chipping rate of the Wideband Code Division Multiple Access (WCDMA) interface, wherein the clock frequency $F_C$ is selected such that the clock signal can be generated using a 38.4 MHz or 19.2 MHz reference clock signal, a non-fractional Phase Locked Loop clock multiplier and an output divider, without first having to divide down the reference clock signal; and sending the data signal and the clock signal between the radio frequency circuit and the baseband circuit using the selected clock frequency $F_C$.

The signals being sent on the link between the radio frequency circuit and the baseband circuit may generate spurious emissions, which may interfere with the transmission and reception of radio signals to and from the antenna. If strong noise is generated, within a radio frequency band at which the device is transmitting or receiving radio signals over the radio transmission system, by sending the clock signal or the data signal over the link, then there is a detrimental effect on the performance of the device. The inventors have realised that the detrimental effects of noise generated by the signals sent over the link can be reduced whilst at the same time reducing the complexity of conversion operations between the signals sent over the link and the radio signals sent/received via the antenna.

In particular, the inventors have realised that some frequencies are particularly advantageous for use with the link clock signal between the radio frequency circuit and the baseband circuit. In particular the frequencies 112.64 MHz, 199.68 MHz, 225.28 MHz and 337.92 MHz have been found to be particularly advantageous. These frequencies are particularly advantageous because they facilitate the conversion of bitstreams at these rates to the rates required for baseband signal processing in GSM (the Global System for Mobile Communications standard), which has a symbol rate of 0.270833 MHz, and in WCDMA (the Wideband Code Division Multiple Access interface), which has a chipping rate of 3.84 MHz. The chosen frequencies for the link clock signal are rational multiples of the GSM symbol rate and the WCDMA chipping rate, i.e. the chosen frequencies can be written as $$\left(\frac{a}{b}\right) \times 0.270833$$

and $$\left(\frac{c}{d}\right) \times 3.84,$$

where a, b, c and d are integers.

The chosen frequencies for the link clock signal have the additional advantage that they can be generated using a commonly available 38.4 MHz (or 19.2 MHz) crystal reference clock and a simple non-fractional Phase-Locked Loop (PLL) clock multiplier without first having to divide down the crystal reference clock (which would lead to a lower quality of clock signal with worse phase noise). This is particularly important if the ADC and/or DAC clocks are to be derived from it.

The chosen frequencies for the link clock signal have the additional advantage that their harmonics fall mainly or completely outside the GSM and WCDMA bands which are commonly used in the radio transmission to and from the device. Table 1 shows the bands in which the radio transmission to and from the radio frequency circuit of the device occur in different transmission schemes.

TABLE 1

Typical frequency bands used in radio transmission

| Band | | | Uplink (UL) UE transmit Frequency/ MHz | | Downlink (DL) UE receive Frequency/ MHz | |
|---|---|---|---|---|---|---|
| | | | from | to | from | to |
| I | 1 | IMT 2100 (Europe, Asia) | 1920 | 1980 | 2110 | 2170 |
| II | 2 | PCS 1900 (Americas, Asia) | 1850 | 1910 | 1930 | 1990 |
| III | 3 | DCS 1800 (world) | 1710 | 1785 | 1805 | 1880 |
| IV | 4 | AWS 1.7/2.1G (Americas) | 1710 | 1755 | 2110 | 2155 |
| V | 5 | Cellular-850 UMTS-850 (Americas) | 824 | 849 | 869 | 894 |
| VI | 6 | Japan UMTS 800 | 830 | 840 | 875 | 885 |
| VII | 7 | IMT-E 2.5 GHz (Europe) | 2500 | 2570 | 2620 | 2690 |
| VIII | 8 | GSM UMTS900 EGSM900 (Europe, Asia) | 880 | 915 | 925 | 960 |
| IX | 9 | Japan UMTS1700 | 1749.9 | 1784.9 | 1844.9 | 1879.9 |
| X | 10 | UMTS, IMT2000 (Americas) | 1710 | 1770 | 2110 | 2170 |
| XI | 11 | PDC (Japan) | 1427.9 | 1452.9 | 1475.9 | 1500.9 |

All harmonics of the frequencies 199.68 MHz and 337.92 MHz fall outside of all the GSM and WCDMA bands listed in Table 1, making these frequencies a very attractive choice. With few exceptions, harmonics also do not fall in recently defined LTE bands (FDD bands 12 to 14 & 17 to 21. TDD bands 33 to 41). For some purposes these frequencies may be too fast, in which case the 112.64 MHz frequency is a suitable alternative for use as the link clock frequency $F_C$.

The frequency of 225.28 MHz has a $4^{th}$ harmonic at 901.12 MHz which is in the uplink section of band VIII (that is the GSM UMTS900 EGSM900 uplink band at 880 to 915 MHz). Therefore using 225.28 MHz as the link clock frequency may create some unwanted RF emissions in the Band VIII uplink frequency range, thereby adding to the noise in that band. However, the frequency of 225.28 MHz does not have a harmonic in any of the other bands listed in Table 1, and is therefore still a very good choice for use as the link clock frequency $F_C$.

The frequency of 112.64 MHz has an $8^{th}$ harmonic at 901.12 MHz which is in the uplink section of band VIII (that is the GSM UMTS900 EGSM900 uplink band at 880 to 915 MHz), and a $19^{th}$ harmonic at 2140.16 MHz which is in the downlink section of bands I, IV and X (that is the IMT 2100 downlink band at 2110 to 2170 MHz, the AWS 1.7/2.1G downlink band at 2110 to 2155 MHz and the UMTS, IMT2000 downlink band at 2110 to 2170 MHz). Therefore using 112.64 MHz as the link clock frequency may create some unwanted noise in the Band VIII uplink frequency range and in the downlink frequency ranges of Bands I, IV and X. However, the chosen frequency of 112.64 MHz does not have a harmonic in any of the other bands listed in Table 1, and is therefore still a very good choice for use as the link clock frequency.

The four frequencies given above (112.64 MHz, 199.68 MHz, 225.28 MHz and 337.92 MHz) also avoid interference with radio transmission in most LTE bands. In this way the frequencies are useful for devices using GSM, WCDMA or LTE bands for radio transmission.

It is noted that for the four frequencies given above (112.64 MHz, 199.68 MHz, 225.28 MHz and 337.92 MHz) all integer multiples of these chosen frequencies are either equally useful or are even better for avoiding unwanted in-band harmonics.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
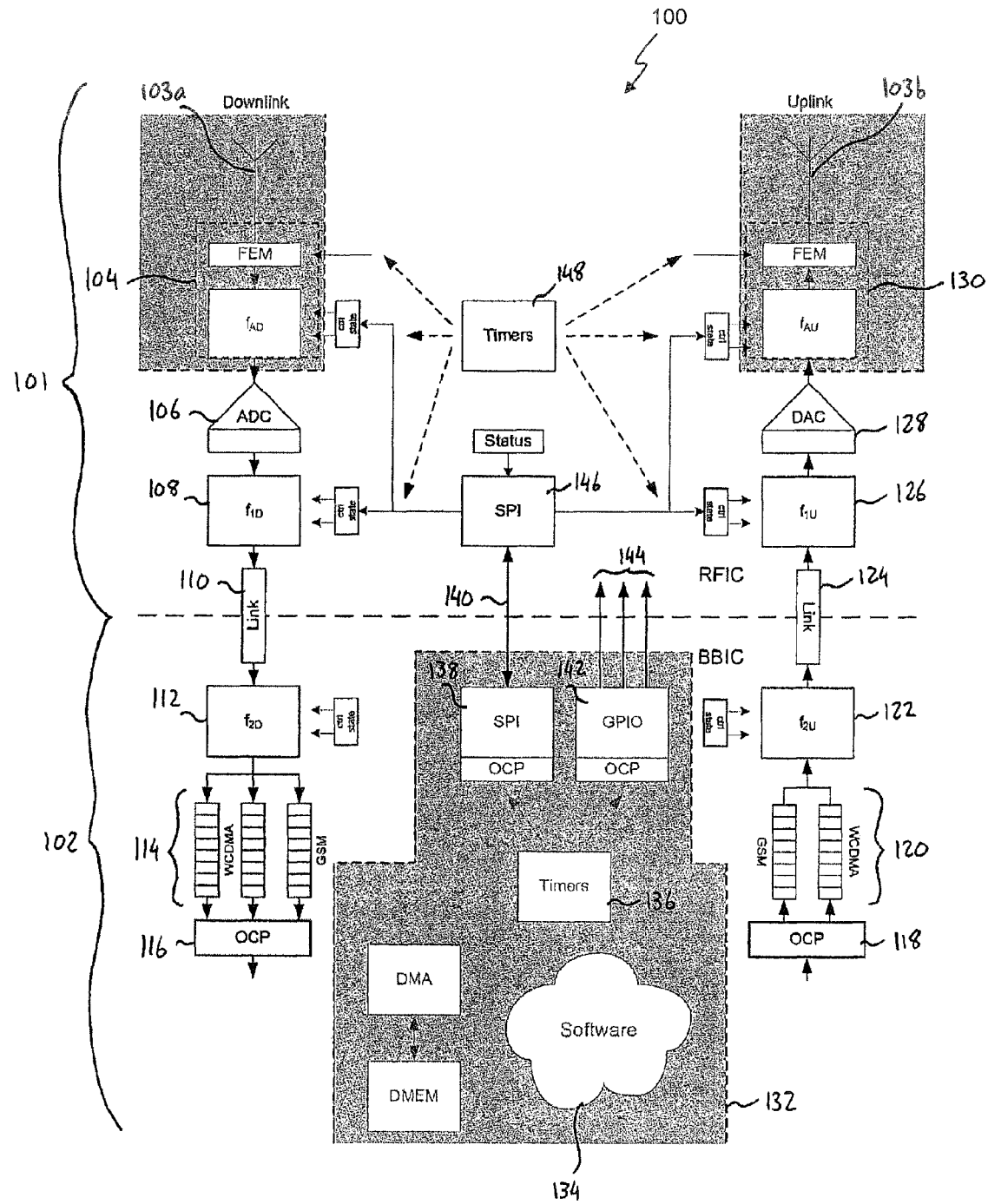
FIG. 1 is a schematic representation of a device according to a preferred embodiment.

With reference to FIG. 1 there is now described a preferred embodiment of the device 100. The specific details of the device 100 are given herein by way of example only, and are not limiting on the scope of protection, which is defined by the appendant claims. Device 100 comprises a radio frequency chip (RF chip) 101 and a baseband chip 102. The device 100 further comprises a receive antenna 103a for receiving radio signals from a radio transmission system and a transmit antenna 103b for transmitting radio signals over the radio transmission system. In preferred embodiments, the receive antenna 103a and the transmit antenna 103b are implemented as the same antenna. However, in other embodiments, the receive antenna 103a is separate from the transmit antenna 103b. The device 100 further comprises a downlink demodulation block 104 and an uplink modulation block 130. The RF chip 101 comprises an analogue to digital converter 106, a downlink RF sample rate converter 108, an uplink RF sample rate converter 126, a digital to analogue converter 128, a RF serial peripheral interface (SPI) block 146 and a RF timer block 148. The baseband chip 102 comprises a downlink BB sample rate converter 112, a plurality of downlink channels 114, a downlink open core protocol (OCP) block 116, an uplink open core protocol (OCP) block 118, a plurality of uplink channels 120 and an uplink BB sample rate converter 122. The device 100 further comprises system on chip components 132 comprising a software block 134, a BB timer block 136, a BB serial peripheral interface (SPI) block 138 and a general purpose input/output (GPIO) block 142. The device further comprises a downlink link 110, an uplink link 124, a SPI link 140 and GPIO links 144 between the RF chip 101 and the baseband chip 102.

An output of the receive antenna 103a is coupled to an input of the downlink demodulation block 104. An output of the downlink demodulation block 104 is coupled to an input of the analogue to digital converter 106. An output of the analogue to digital converter 108 is coupled to an input of the downlink RF sample rate converter 108. An output of the downlink RF sample rate converter 108 is coupled to an input of the downlink BB sample rate converter 112 via the downlink link 110. Outputs of the downlink BB sample rate converter 112 are coupled to inputs of the downlink open core protocol (OCP) block 116 via the plurality of downlink channels 114. Outputs of the uplink open core protocol block 118 are coupled to inputs of the uplink BB sample rate converter 122 via the plurality of uplink channels 120. An output of the uplink BB sample rate converter 122 is coupled to an input of the uplink RF sample rate converter 126 via the uplink link 124. An output of the uplink RF sample rate converter 126 is coupled to an input of the digital to analogue converter 128. An output of the digital to analogue converter 128 is coupled to an input of the uplink modulation block 130. An output of the uplink modulation block 130 is coupled to an input of the transmit antenna 103b. The BB SPI block 138 is coupled to the RF SPI block 146 via the SPI link 140. The GPIO block 142 is coupled to the RF chip 101 via the GPIO links 144. The BB timer block 136 controls the timing of the BB SPI block 138 and the GPIO block 142. A first output of the RF SPI block 146 is coupled to an input of the downlink RF sample rate converter 108 and to an input of the downlink demodulation block 104. A second output of the RF SPI block 146 is coupled to an input of the uplink RF sample rate converter 126 and to an input of the uplink modulation block 130. The RF timer block 148 controls the timing of the downlink demodulation block 104, the downlink RF sample rate converter 108, the uplink RF sample rate converter and the uplink modulation block 130.

We now describe a broad overview of the operation of the device 100. Firstly, there is described the operation of the device when a radio signal is received at the receive antenna 103a. The radio signal is received from a radio transmission system in which the device 100 operates. The received radio signal is an analogue data signal which has been modulated to a radio frequency. The received radio signal is passed to the downlink demodulation block 104 where the radio signal is demodulated (using a conventional demodulation method as would be apparent to a skilled person), such that the output of the downlink demodulation block 104 is an analogue data signal. The timing of the downlink demodulation block 104 is controlled by the RF timer block 148. The analogue data signal is passed to the analogue to digital converter 106 which converts the analogue data signal into a digital data signal and outputs the digital data signal to the downlink RF sample rate converter 108. The signal is passed over the downlink link 110 from the downlink RF sample rate converter 108 in the RF chip 101 to the downlink BB sample rate converter 112 in the baseband chip 102. The sample rate converters 108, 112, 122 and 126 contain no buffering, e.g. no FIFOs and no serial to parallel conversion. Downlink RF sample rate converter 108 is basically a low pass filter with a sigma delta modulator. This allows 1-bit sampling to be used across the downlink link 110, with no packetisation of the data signal, such that the downlink link 110 transfers a 1-bit serial stream on a channel.

The downlink link 110 comprises two identical RX channels (one main channel and one diversity channel). Each channel consists of an I and a Q path. Each channel path is built from two wires, which are a differential Low Voltage Differential Signalling (LVDS) pair. Thus, there are 8 wires in total for the downlink link 110, i.e. 2 channels each with 2 I/Q paths comprising 2 wires per LVDS pair). An interface clock is generated in the RF chip 101 and sent across to the baseband chip 102 as an LVDS signal, thereby using 2 wires. On the downlink link 110 the clock signal and the data signal are sent together. In other embodiments, the downlink link may comprise different numbers, and/or different types, of wires and be configured to transfer data and clock signals in a different manner as would be apparent to a person skilled in the art.

The timing of the downlink BB sample rate converter 112 is controlled using the BB timer block 136. The output of the downlink BB sample rate converter 112 comprises at least one digital data stream, synchronised with the clock signal generated by the BB timer block 136. The digital data streams are sent over the plurality of downlink channels 114 to the downlink OCP block 116. The downlink OCP block 116 provides an interface between the data signal(s) on the downlink channels 114 and the system on chip elements 132.

Secondly, we now describe a broad overview of the operation of the device 100 when signals are to be transmitted from the transmit antenna 103b. A digital data signal is fed into the uplink OCP block 118 from the on chip elements 132. The uplink OCP block 118 provides an interface between the data signal(s) on the downlink channels 114 and the system on chip elements 132. The data signal is passed via the uplink channels 120 to the uplink BB sample rate converter 122. The signal is passed over the uplink link 124 from the uplink BB sample rate converter 122 in the BB chip 102 to the uplink RF sample rate converter 126 in the RF chip 101. Uplink BB sample rate converter 122 is basically a low pass filter with a sigma delta modulator. This allows 1-bit sampling to be used across the uplink link 124, with no packetisation of the data signal, such that the uplink link 124 transfers a 1-bit serial stream on a channel.

There is a single channel on the uplink link 124 (i.e. there is no diversity channel as there is on the downlink link 110). The channel on the uplink link 124 comprises an I and a Q path. Each channel path comprises two wires, which are a LVDS pair. Thus, there are 4 wires in total on the uplink link 124, there being 2 I/Q paths each formed from 2 wires per LVDS pair. The clock signal received from the RF chip 101 at the baseband chip 102 is returned to the RF chip 101 using a 2 wire LVDS pair. On the uplink link 124 the clock signal is sent together with the data signal. In other embodiments, the uplink link may comprise different numbers, and/or different types, of wires and be configured to transfer data and clock signals in a different manner as would be apparent to a person skilled in the art.

The timing of the uplink BB sample rate converter 122 is controlled using the BB timer block 136, and the timing of the uplink RF sample rate converter 126 is controlled using the RF timer block 148. The data signal is output from the uplink RF sample rate converter block 126 and passed to the digital to analogue converter 128 where it is converted to an analogue signal. The analogue signal is then passed to the uplink modulation block 130 where it is modulated (using conventional techniques as would be apparent to the skilled person) and then transmitted over the radio transmission system via the transmit antenna 103b.

Figure 2:
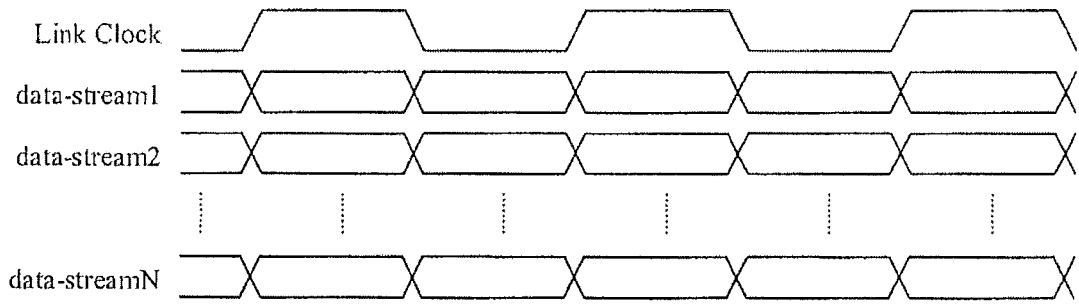
FIG. 2 is a timing diagram showing a clock signal and a plurality of data stream signals according to a preferred embodiment.

It will be appreciated that the signals passed over the downlink link 110 and the uplink link 124 are digital signals, since both the analogue to digital converter 106 in the downlink and the digital to analogue converter 128 in the uplink are situated in the RF chip 101. As described above, in order to send data signals over the downlink and uplink links (110 and 124) between the RF chip 101 and the baseband chip 102, a clock signal is used to provide the timing of the data signals. FIG. 2 shows a clock signal and a plurality of data streams being sent over the link (110 or 124). The clock signal has a clock frequency $F_C$ and the data bit boundaries on the data streams are defined by the transitions on the clock signal. Therefore the data stream signals have a bit rate of $2F_C$ bits per second.

The clock signal is approximately a square wave with frequency $F_C$. The spectrum of noise generated by the clock signal will comprise components at harmonics of the clock signal (i.e. at multiples of $F_C$). Similarly, the spectrum of noise generated by the data stream signals is dependent upon the clock frequency $F_C$.

It is therefore advantageous to choose the clock frequency $F_C$ to reduce the detrimental effects of noise from signals sent on the downlink and uplink links (110 and 124) on signals transmitted and received over the wireless network via the antennas (103a and 103b). It is therefore advantageous to choose the clock frequency $F_C$ such that its harmonics fall mainly or completely outside the GSM and WCDMA frequency bands shown in Table 1 above. Avoiding the frequency bands shown in Table 1 is one consideration for selecting a suitable clock frequency $F_C$.

A symbol rate of 0.270833 MHz is used in a GSM system, whilst a chipping rate of 3.84 MHz is used in a WCDMA system. It is advantageous for the data signals sent over the downlink and uplink links (110 and 124) to be easily converted to and from signals at the symbol rate (0.270833 MHz) of GSM and the chipping rate (3.84 MHz) of WCDMA. This allows data signals to be easily converted into radio signals for transmission via the transmit antenna 103b and allows radio signals received at the receive antenna 103a to be easily converted into data signals to be sent over the downlink link 110 to the baseband chip 102. Being able to easily convert between the clock frequency $F_C$ and the GSM symbol rate or the WCDMA chipping rate is another consideration for selecting a suitable clock frequency $F_C$.

The clock signals generated in the device 100 are based on a reference clock signal (e.g. a crystal reference clock signal), having a frequency of 38.4 MHz or 19.2 MHz. It is advantageous for the clock frequency $F_C$ of the link (110 and 124) to be easily generated from this reference clock signal. In particular, it is advantageous for the chosen frequency for the clock signal $F_C$ to be able to be generated from the reference clock signal using a non-fractional PLL clock multiplier without first having to divide down the reference clock signal. Dividing down the reference clock signal would lead to a lower quality of clock signal with worse phase noise. Being able to generate the clock signal with frequency $F_C$ easily from the reference clock signal is another consideration for selecting a suitable clock frequency $F_C$.

The inventors have realised that four frequencies (and integer multiples thereof) are particularly advantageous for use as the clock frequency $F_C$ in view of the considerations detailed above. These four frequencies are 112.64 MHz, 199.68 MHz, 225.28 MHz and 337.92 MHz.

As described above all harmonics of the frequencies 199.68 MHz and 337.92 MHz fall outside of all the GSM and WCDMA bands listed in Table 1, making these frequencies a very attractive choice, if a little fast for some purposes. The frequency of 225.28 MHz has a $4^{th}$ harmonic at 901.12 MHz which is in the uplink section of band VIII (that is the GSM UMTS900 EGSM900 uplink band at 880 to 915 MHz) and the frequency of 112.64 MHz an $8^{th}$ harmonic at 901.12 MHz which is in the uplink section of band VIII (that is the GSM UMTS900 EGSM900 uplink band at 880 to 915 MHz), and a $19^{th}$ harmonic at 2140.16 MHz which is in the downlink section of bands I, IV and X (that is the IMT 2100 downlink band at 2110 to 2170 MHz, the AWS 1.7/2.1G downlink band at 2110 to 2155 MHz and the UMTS, IMT2000 downlink band at 2110 to 2170 MHz). However, the frequencies of 112.64 MHz and 225.28 MHz do not have harmonics in any bands listed in Table 1 other than those mentioned above, and they are therefore still very good choices for use as the link clock frequency $F_C$. The four frequencies (112.64 MHz, 199.68 MHz, 225.28 MHz and 337.92 MHz) also avoid interference with radio transmission in most LTE bands.

All four of the chosen frequencies given above facilitate simple conversion of bit-streams at these rates to the rates required for both GSM, WCDMA & LTE since the chosen frequencies are rational multiples of both the GSM symbol rate (0.270833 MHz), the WCDMA chipping rate (3.84

MHz) and the LTE sampling rates (1×, 2×, 4×, 6× & 8×3.84 MHz depending on bandwidth, that is 3.84, 7.68, 15.36, 23.04 and 30.72 MHz). By "rational multiple" we mean that by multiplying 0.270833 MHz by a/b where a and b are integers we arrive at the clock frequency $F_C$, and similarly by multiplying 3.84 MHz by c/d where c and d are integers we arrive at the clock frequency $F_C$. This is illustrated below with the following equations:

$$112.64 = (4 \times 0.270833)\frac{2^{10} \times 3 \times 11}{13 \times 25} \text{ and } 112.64 = (8 \times 3.84) \times \frac{11}{3},$$

$$225.28 = (4 \times 0.270833)\frac{12^{11} \times 3 \times 11}{13 \times 25} \text{ and } 225.28 = (8 \times 3.84) \times \frac{2 \times 11}{3},$$

$$199.68 = (4 \times 0.270833)\frac{2^9 \times 3^2}{25} \text{ and } 199.68 = (8 \times 3.84) \times \frac{13}{2},$$

$$337.92 = (4 \times 0.270833)\frac{2^{10} \times 3^2 \times 11}{13 \times 25} \text{ and } 337.92 = (8 \times 3.84) \times 11.$$

The equations above show that the four chosen frequencies for the link clock signal are easily converted to and from the 0.270833 MHz symbol rate of GSM and to and from the 3.84 MHz chipping rate of WCDMA or an integer multiple of 3.84 MHz for LTE by multiplication with a factor of a/b where a and b are integers. Preferably a and b are small integers. In the equations above the conversion between the four chosen frequencies and 0.270833 MHz or 3.84 MHz can be achieved by a plurality of multiplication or division operations with factors of 2, 3, 5, 11 and 13 (noting that $25=5^2$, $9=3^2$ and $8=2^3$). These sample rate multiplication and division operations are simple to apply using a series of CIC (Cascaded Integrator-Comb) filter stages because the factors are small. The integers that constitute the rational multipliers (e.g. a and b as described above) can preferably be factorized into relatively small numbers. If this were not the case then the signal processing required for sample rate conversion would be complex and power hungry. To take an extreme example, a rational multiplier comprised of two large prime numbers would be unfavourable since it would be necessary to convert up to a very high frequency before dividing back down again to the target frequency. Instead, in preferred embodiments when the numerator and denominator (e.g. a and b) can both be factorized into smaller integers, it is possible to convert up and then down a number of times until the target frequency is reached, always avoiding extremely high frequencies.

Furthermore, each of the four chosen frequencies can be generated from a 38.4 MHz reference clock signal (or a 19.2 MHz reference clock signal) using a simple non-fractional PLL clock multiplier without first having to divide down the reference clock signal. An example of how this is achieved for each clock frequency is given below:

112.64 MHz can be generated by multiplying 38.4 MHz by 88 to 3.3792 GHz and then dividing by 30.

199.68 MHz can be generated by multiplying 38.4 MHz by 104 to 3.9936 GHz and then dividing by 20.

225.28 MHz can be generated by multiplying 38.4 MHz by 88 to 3.3792 GHz and then dividing by 15 (or by dividing by 30 and then using both edges of the clock).

337.92 MHz can be generated by multiplying 38.4 MHz by 88 to 3.3792 GHz and then dividing by 10.

Figure 3:
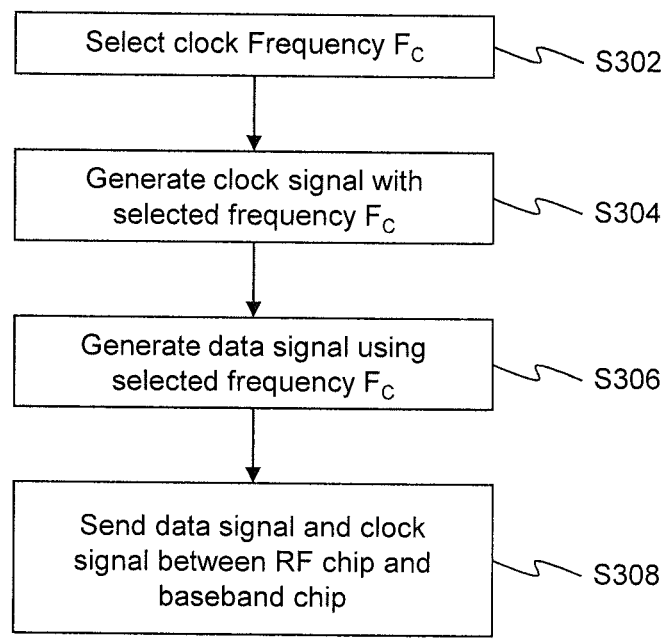
FIG. 3 is a flow chart for a process of sending a data signal and a clock signal according to a preferred embodiment.

A process of sending a data signal and a clock signal between the RF chip 101 and the baseband chip 102 according to a preferred embodiment will now be described with reference to the flow chart shown in FIG. 3. In step S302 the device 100 selects the clock frequency $F_C$ to use on the link (110 or 124). The clock frequency $F_C$ is chosen in accordance with the criteria described above. The clock frequency $F_C$ may be chosen as one of 112.64 MHz, 199.68 MHz, 225.28 MHz and 337.92 MHz.

Once the clock frequency $F_C$ has been chosen, in step S304 the link clock signal is generated using the reference clock signal as described above. This is a simple process because of the selection of $F_C$ as described above. In particular, in preferred embodiments the clock signal is generated with the selected clock frequency $F_C$ using the 38.4 MHz or the 19.2 MHz reference clock signal and a non-fractional Phase Locked Loop clock multiplier without first dividing down the reference clock signal.

In step S306 the data signal to be sent over the link is generated using the selected clock frequency $F_C$. The details of how the data signal is generated using the selected clock frequency $F_C$ are known to those skilled in the art and are not described here. The data signal may, or may not, be an interleaved data stream having interleaved I and Q bit streams as is known in the art.

In step S308 the data signal and clock signal are sent between the RF chip 101 and the baseband chip 102 using the clock frequency $F_C$.

It would be apparent to a person skilled in the art that the exact mechanisms for generating the clock signal and the data signal may be different in different embodiments. What is required is that the clock frequency $F_C$ is selected in accordance with the criteria described above and that the data and clock signals are sent using the selected clock frequency $F_C$.

References herein to sending signals between the RF chip 101 and the baseband chip 102 include sending the signals from the RF chip 101 to the baseband chip (e.g. over downlink link 110) and also include sending the signals from the baseband chip 102 to the RF chip 101 (e.g. over uplink link 124).

There has been described above a method and device for sending data and clock signals over a link (110 or 124) between the RF chip 101 and the baseband chip 102. The clock frequency $F_C$ used for the link clock signal and the data signal sent over the link is selected to be easily generated from a reference clock signal (at 38.4 or 19.2 MHz) and easily converted to the 0.270833 MHz symbol rate of GSM and to the 3.84 MHz chipping rate of WCDMA and to an integer multiple of 3.84 MHz for LTE. Furthermore, preferably the harmonics of the selected clock frequency fall mainly or completely outside the commonly used GSM and WCDMA bands (given in Table 1 above). The inventors have found that the four frequencies of 112.64 MHz, 199.68 MHz, 225.28 MHz and 337.92 MHz (and any integer multiples of these four frequencies) are particularly good candidates for use as the link clock frequency $F_C$.

The above method may be coded into computer readable instructions which can be implemented at the device in order to carry out the invention, as would be apparent to a person skilled in the art.

While this invention has been particularly shown and described with reference to preferred embodiments, it will be understood to those skilled in the art that various changes in form and detail may be made without departing from the scope of the invention as defined by the appendant claims.

The invention claimed is:

1. A method of sending a data signal and a clock signal between a radio frequency circuit of a device and a baseband circuit of the device, the radio frequency circuit being configured for at least one of transmission and reception of radio signals in a radio frequency band, the clock signal having a clock frequency $F_C$, the method comprising:
selecting the clock frequency $F_C$ to be a rational multiple of the 0.270833 MHz symbol rate of the Global System for Mobile Communications (GSM) standard and a rational multiple of the 3.84 MHz chipping rate of the Wideband Code Division Multiple Access (WCDMA) interface, wherein the clock frequency $F_C$ is selected from an integer multiple of 112.64 MHz or 199.68 MHz such that the clock signal can be generated using a 38.4 MHz or 19.2 MHz reference clock signal, a non-fractional Phase Locked Loop clock multiplier and an output divider, without first having to divide down the reference clock signal; and
sending the data signal and the clock signal between the radio frequency circuit and the baseband circuit using the selected clock frequency $F_C$.

2. The method of claim 1 wherein the clock frequency $F_C$ is selected such that it does not have a harmonic falling within one of the following frequency bands: 1920 to 1980 MHz, 1850 to 1910 MHz, 1930 to 1990 MHz, 1710 to 1785 MHz, 1805 to 1880 MHz, 1710 to 1755 MHz, 824 to 849 MHz, 869 to 894 MHz, 830 to 840 Hz, 875 MHz to 885 MHz, 2500 to 2570 MHz, 2620 to 2690 MHz, 925 to 960 MHz, 1749.9 to 1784.9 MHz, 1844.9 to 1879.9 MHz, 1710 to 1770 MHz, 1427.9 to 1452 MHz and 1475.9 and 1500.9 MHz.

3. The method of claim 2 wherein the clock frequency $F_C$ is 112.64 MHz or an integer multiple of 112.64 MHz.

4. The method of claim 2 wherein the clock frequency $F_C$ is further selected such that it does not have a harmonic falling within one of the following frequency bands: 2110 to 2170 MHz and 2110 to 2155 MHz.

5. The method of claim 4 wherein the clock frequency $F_C$ is 225.28 MHz or an integer multiple of 225.28 MHz.

6. The method of claim 4 wherein the clock frequency $F_C$ is further selected such that it does not have a harmonic falling within the frequency band of 880 to 915 MHz.

7. The method of claim 6 wherein the clock frequency $F_C$ is 199.68 MHz or an integer multiple of 199.68 MHz.

8. The method of claim 6 wherein the clock frequency $F_C$ is 337.92 MHz or an integer multiple of 337.92 MHz.

9. The method of claim 1 wherein the clock frequency $F_C$ is 112.64 MHz or an integer multiple of 112.64 MHz.

10. The method of claim 1 wherein the clock frequency $F_C$ is 225.28 MHz or an integer multiple of 225.28 MHz.

11. The method of claim 1 wherein the clock frequency $F_C$ is 199.68 MHz or an integer multiple of 199.68 MHz.

12. The method of claim 1 wherein the clock frequency $F_C$ is 337.92 MHz or an integer multiple of 337.92 MHz.

13. The method of claim 1 further comprising generating the clock signal with the selected clock frequency $F_C$ using the 38.4 MHz or the 19.2 MHz reference clock signal, the non-fractional Phase Locked Loop clock multiplier and the output divider, without first dividing down the reference clock signal.

14. The method of claim 13 further comprising generating the data signal using the selected clock frequency $F_C$.

15. The method of 13 wherein the clock frequency $F_C$ can be generated from the 0.270833 MHz symbol rate of the Global System for Mobile Communications standard using a plurality of multiplication or division operations with factors of 2, 3, 5, 11 and 13, and wherein the clock frequency $F_C$ can be generated from the 3.84 MHz chipping rate of the Wideband Code Division Multiple Access interface using a further plurality of multiplication or division operations with factors of 2, 3, 5, 11 and 13.

16. The method of claim 1 wherein the clock frequency $F_C$ can be generated from the 0.270833 MHz symbol rate of the Global System for Mobile Communications standard using a plurality of multiplication or division operations with factors of 2, 3, 5, 11 and 13, and wherein the clock frequency $F_C$ can be generated from the 3.84 MHz chipping rate of the Wideband Code Division Multiple Access interface using a further plurality of multiplication or division operations with factors of 2, 3, 5, 11 and 13.

17. A device comprising:
a radio frequency circuit configured for at least one of transmission and reception of radio signals in a radio frequency band; and
a baseband circuit,
the device being configured to send a data signal and a clock signal between the radio frequency circuit and the baseband circuit, the clock signal having a clock frequency $F_C$, the device being further configured to:
select the clock frequency $F_C$ to be a rational multiple of the 0.270833 MHz symbol rate of the Global System for Mobile Communications (GSM) standard and a rational multiple of the 3.84 MHz chipping rate of the Wideband Code Division Multiple Access (WCDMA) interface, wherein the device is configured to select the clock frequency $F_C$ from an integer multiple of 112.64 MHz or 199.68 MHz such that the clock signal can be generated using a 38.4 MHz or 19.2 MHz reference clock signal, a non-fractional Phase Locked Loop clock multiplier and an output divider, without first having to divide down the reference clock signal; and
send the data signal and the clock signal between the radio frequency circuit and the baseband circuit using the selected clock frequency $F_C$.

18. The device of claim 17 further comprising means for generating the reference clock signal having a frequency of 38.4 MHz or 19.2 MHz.

19. The device of claim 17 further comprising a non-fractional Phase Locked Loop clock multiplier and an output divider for use in generating the clock signal.

20. A computer program product comprising computer readable instructions stored on a non-transitory computer readable medium for execution at a device, the device comprising a baseband circuit and a radio frequency circuit configured for at least one of transmission and reception of radio signals in a radio frequency band, the device being configured to send a data signal and a clock signal between the radio frequency circuit and the baseband circuit, the clock signal having a clock frequency $F_C$, the instructions configured to direct the operation of a processor when executed and comprising instructions for:
selecting the clock frequency $F_C$ to be a rational multiple of the 0.270833 MHz symbol rate of the Global System for Mobile Communications (GSM) standard and a rational multiple of the 3.84 MHz chipping rate of the Wideband Code Division Multiple Access (WCDMA) interface, wherein the clock frequency $F_C$ is selected from an integer multiple of 112.64 MHz or 199.68 MHz such that the clock signal can be generated using a 38.4 MHz or 19.2 MHz reference clock signal, a non-fractional Phase Locked Loop clock multiplier and an output divider, without first having to divide down the reference clock signal; and sending the data signal and the clock signal between the radio frequency circuit and the baseband circuit using the selected clock frequency $F_C$.

\* \* \* \* \*